United States Patent [19]

Pellerin et al.

[11] 4,024,491
[45] May 17, 1977

[54] WIRELESS MARINE NAVIGATIONAL AID SYSTEM

[75] Inventors: William Dodd Pellerin, Houston; Peter Webb Higgins, Cypress; Joseph Henery Parnell, III, Houston, all of Tex.

[73] Assignee: Tideland Signal Corporation, Houston, Tex.

[22] Filed: July 18, 1975

[21] Appl. No.: 597,064

[52] U.S. Cl. .............................. 340/5 R; 340/29; 340/331; 340/332
[51] Int. Cl.² .................. G01V 1/00; H04B 13/00; H04R 15/00
[58] Field of Search .......... 340/4 R, 5 R, 15, 16 C, 340/29, 331, 332

[56] References Cited
UNITED STATES PATENTS

| | | | |
|---|---|---|---|
| 3,781,853 | 12/1973 | Jacobs | 340/29 |
| 3,786,406 | 1/1974 | Bianco | 340/5 R |
| 3,787,867 | 1/1974 | Dodge et al. | 340/29 |

Primary Examiner—Maynard R. Wilbur
Assistant Examiner—T. M. Blum
Attorney, Agent, or Firm—Fulbright & Jaworski

[57] ABSTRACT

A marine navigational aid system in which at least two marine aids, such as lights, are controlled, such as synchronized, relative to each other without the units being connected with an electrical cable. A marine navigational aid system having an underwater sonic transmitter and receiver for transmitting and receiving coded acoustical signals for controlling navigational aids. A typical installation would consist of a transmitter and a receiver each of which is connected to and actuates a navigational aid. The transmitter sends a complex synchronizing code underwater to the receiver. If the receiver detects and decodes the signal, the receiver is synchronized relative to the transmitter. Both the transmitter and receiver have master clocks which are self-actuated, but the clock of the receiver is controlled and is resettable by a properly decoded signal from the transmitter. Additionally, the receiver has a lockout circuit which inhibits control of the receiver by the transmitter when environmental noise exceeds a preset level. However, the timing clocks are accurate and stable so that after one synchronizing signal is received by the receiver, the transmitter and receiver will remain in synchronism for a long period of time.

4 Claims, 12 Drawing Figures

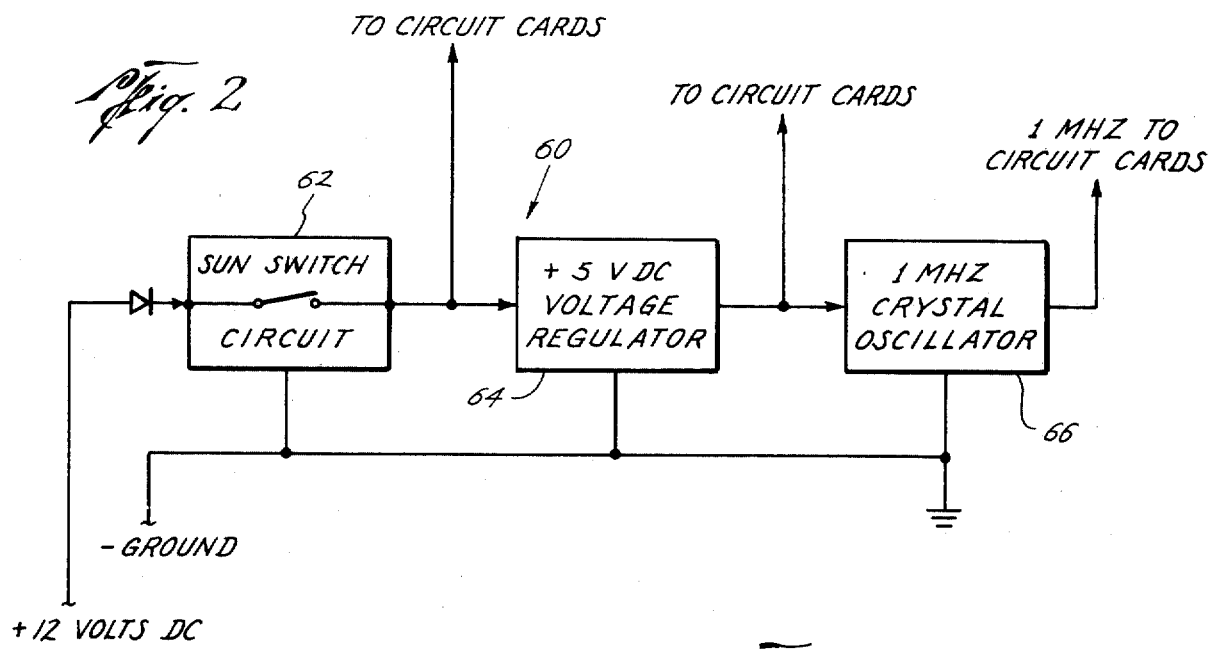
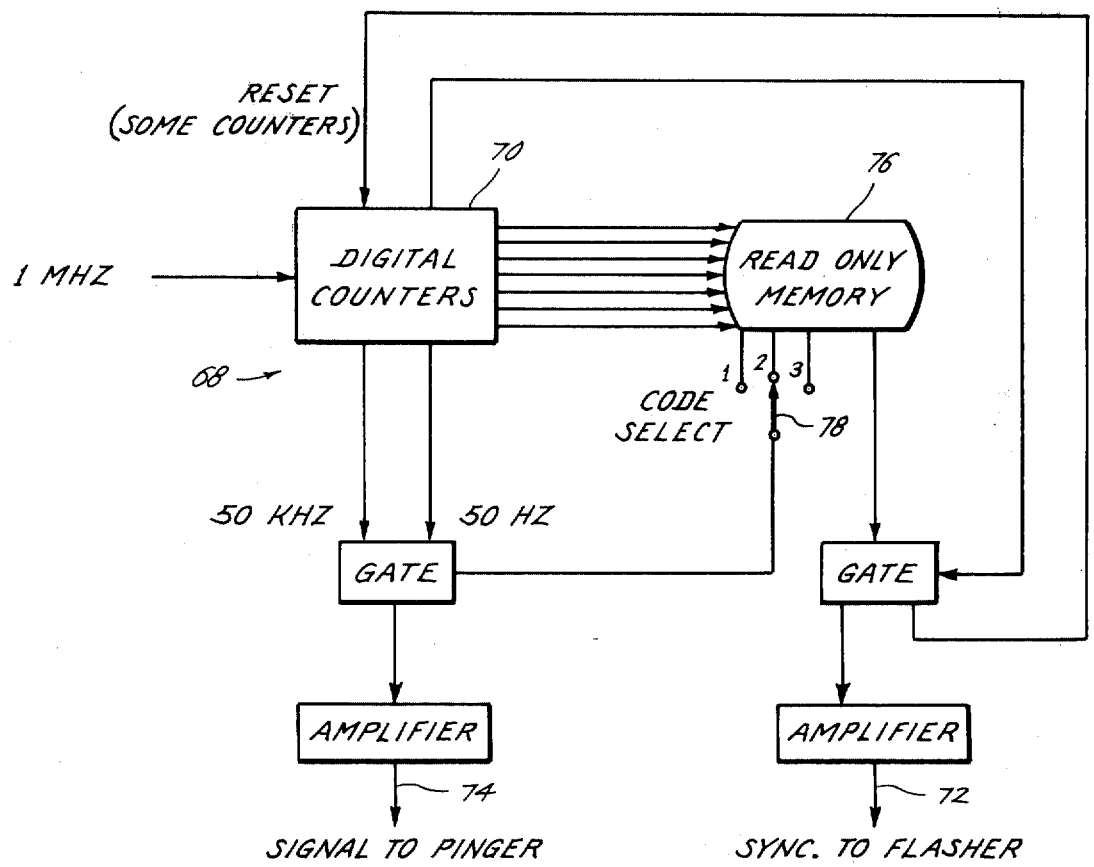

WIRELESS MARINE NAVIGATIONAL AID SYSTEM

BACKGROUND OF THE INVENTION

Marine navigational aids, such as lights and foghorns, are use to mark obstructions in channels and otherwise assist in marine used Frequently, a plurality of aids are jointly used to provide either navigational signals which are operated in synchronism or sequentially. For example, see U.S. Pat. No. 3,781,853. Such systems ae interconnected for control by an electrical cable. However, many problems exist is attempting to interconnect two navigational aids which are spaced apart in the water, such as floating buoys. Such cables are subject to being broken, voltage losses occur in the cables and the cables are difficult to install.

The present invention is directed to a marine navigational aid system in which two or more units are interconnected by a wireless signal, such as an acoustical signal, instesd of an interconnected cable. The present invention is directed to various improvements in a wireless marine navigational aid system in which two or more units interact with each other by wireless signals.

SUMMARY

The present invention is directed to a wireless navigational aid system having two or more navigational aids which are spaced apart in the water and coact with each other by means of coded wireless signals.

A further object of the present invention is the provision of a wireles marine navigational aid system having a least one transmitter and one receiver for controlling the actuation of a marine navigational aid on each of the transmitter and receiver in which the transmitter includes a timing clock and means for transmitting a coded wireless signal. A first navigational aid is electrically connected to and is actuated by the transmitter. A receiver is spaced from the transmitter and includes a timing clock and means for receiving and decoding the coded signal received from the transmitter. A second navigational aid is electrically connected to and is actuated by the receiver. The timing clock of the receiver is self-actuated to insure that the second navigational aid is always suitably timed, but the timing clock of the receiver is controlled by and is reset to the timing clock of the transmitter through the coded signals so that the navigational aid on the receiver is controlled by the transmitter.

Still a further object of the present invention is the provision of a wireless marine navigational aid system having at least one transmitter and receiver for controlling the actuation of a marine navigational aid on each of the transmitter and receiver in which the receiver is controlled by the transmitter through coded wireless signals which will insure that the receiver is not actuated by spurious environmental signals.

Still a further object of the present invention is the provision of stable timing clocks in both the transmitter and receiver to insure that the navigational aids on the transmitter and receiver remain accurately timed relative to each other for prolonged periods of time even in the absence of a properly received decoded signal by the receiver.

Yet a still further object of the present invention is the provision of a lockout circuit in the receiver which inhibits the control of the receiver by the transmitter when environmental wireless signals exceed a predetermined level.

Other and further features and advantages will be readily apparent from the following description of a preferred embodiment.

DESCRIPTION OF THE DRAWINGS

FIG. 2 is an electrical block diagram of a circuit that is common to both a transmitter and receiver which includes a sunswitch circuit, a voltage regulator circuit, and a timing circuit, FIG. 3 is an electrical block diagram of the transmitter circuit.

DESCRIPTION OF THE PREFERRED EMBODIMENT

While the marine navigational aid system of the present invention will be described in its use as utilizing sonic signals for synchronizing navigational lights for purposes of illustration, it is to be recognized that the present invention is useful in controlling other types of navigational aids such as horns and using other types of wireless signals, such as light or radio waves. Furthermore, while the present invention will be described in connection with a navigational aid system in which navigational lights are synchronized with each other, it is recognized that the present invention can be used in any operation in which one navigational aid is controlled by a second navigational aid, such as in a desired timed sequence.

Figure 1:
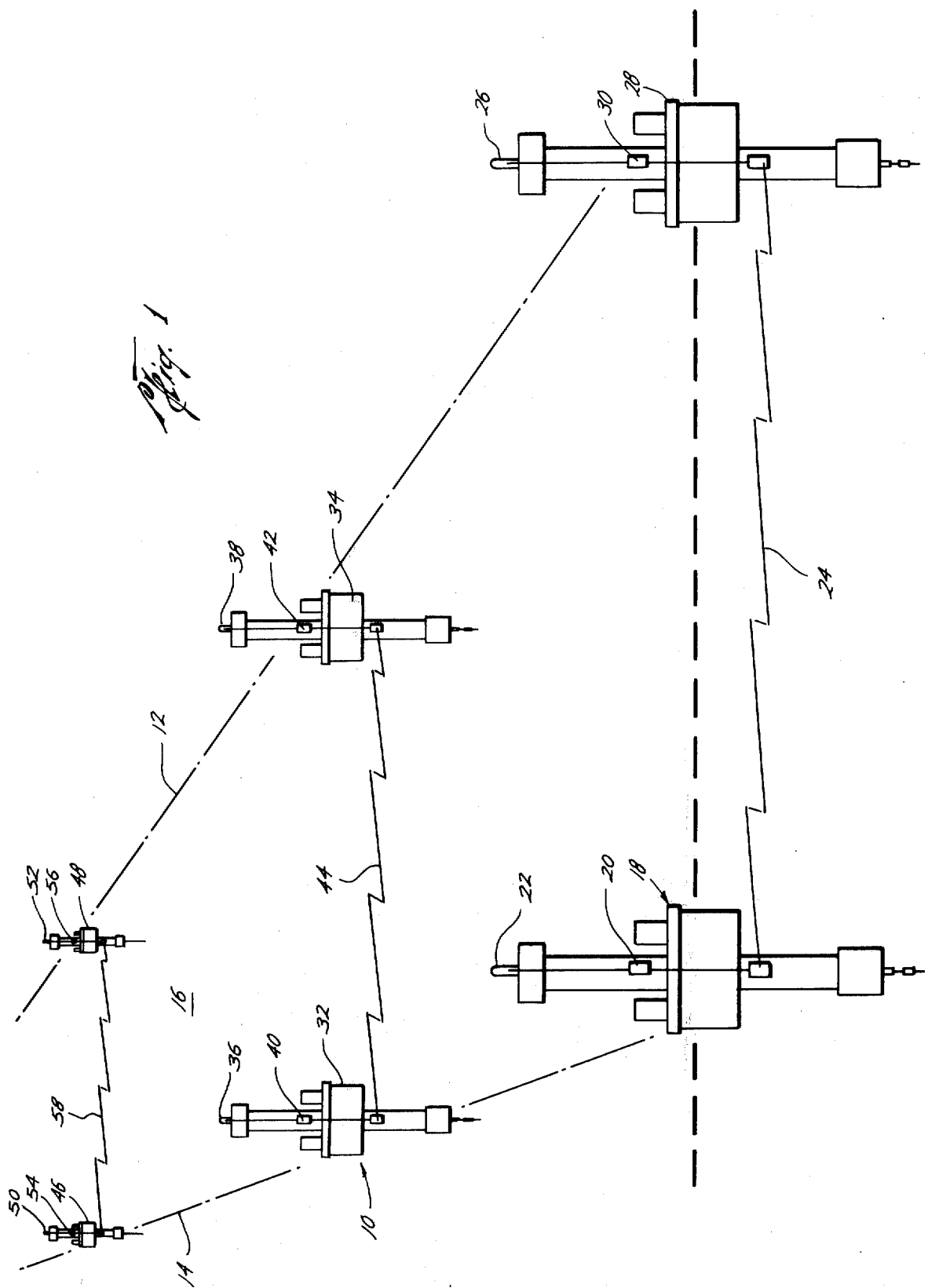
FIG. 1 is a perspective view of a plurality of channel marker buoys utilizing the marine navigational system of the present invention.

Referring now to FIG. 1, the marine navigational aid system of the present invention is generally referred to by the reference numeral 10, for marking the outer limits 12 and 14 of a channel 16.

A first marine buoy 18 includes a transmitter 20 for actuating a conventional navigational light 22 as well as transmitting a coded sonic signal 24 for actuating and controlling one or more navigational lights, such as light 26, on a buoy 28 which includes a receiver 30.

A second set of buoys 32 and 34 each having navigational lights 36 and 38, respectively, are provided further along the channel 16 with the buoy 32 having a transmitter 40 and the buoy 34 having a receiver 42. However, the sonic signal 44 emitted by the transmitter 40 is coded differently from the sonic signal 24 emitted by the transmitter 20 on the buoy 18. Similarly, the system 10 may include additional buoys such as 46 and 48 having navigational lights 50 and 52, respectively, with buoy 46 having a transmitter 54 and buoy 48 having a receiver 56. The sonic signal 58 emitted by the transmitter 54 may be different from either of the sonic signals 24 and 26 emitted by the transmitters 20 and 40, respectively, or if the buoys 46 and 48 are remotely spaced from the buoys 18 and 28 at a sufficient distance, the coded signal 58 may be identical to the coded signal 24.

A common circuit generally indicated by the reference numeral 60 is shown which is used in both the transmitter, such as transmitter 20 on buoys 18, as well as a receiver, such as receiver 30 on buoy 28. The common circuit includes a sunswitch circuit 62 which acts as a switch to disconnect the input voltage from other circuits during the daytime thereby conserving battery power which is generally used. The circuit 60 also includes a voltage regulator circuit 64 to provide regulated voltage to other circuits. In addition, a crystal oscillator 66 is provided and is actuated when the sunswtich circuit 62 is closed and receives power from the voltage regulator 64 to provide a 1 MHz 5 volt square wave for use by either the transmitter or receiver.

Figure 9:
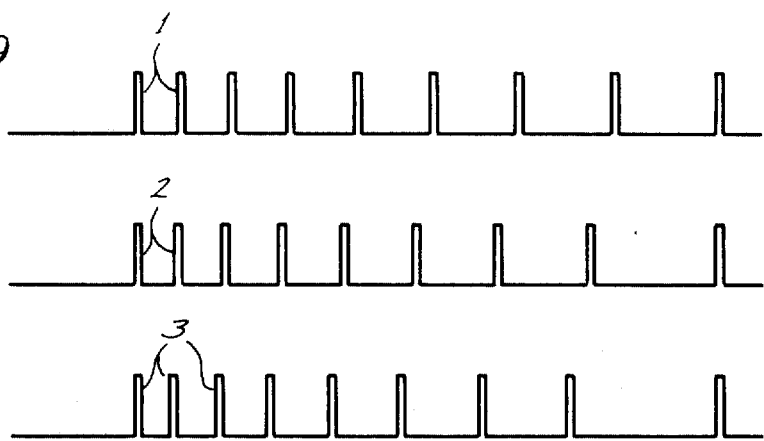
FIG. 9 is a timing diagram of three typical transmitting codes.

Referring now to FIG. 3, the transmitter circuit, generally indicated by the reference numeral 68, includes digital counters 70 which receive the 1 MHz signal from the common circuit 60 to FIG. 2 and includes a first output 72 to provide an actuating and synchronizing pulse for its associated navigational light. For example, referring to the buoy 18 of FIG. 1, the transmitter 20 would provide at output 72 a synchronizing pulse to the navigational light 22 which may be of any suitable type such as the model TF3B Flasher/Lamp Changer sold by Tideland Signal Corporation. In addition, the transmitter circuit provides a 50 kHz gated signal at output 74 of the proper code to provide the sonic signal, such as signal 24 of FIG. 1. The desired code is obtained from memory circuit 76 through a suitable code select switch 78. The switch 78 may be positioned at position 1, 2 or 3 to provide either coded signals 1, 2 or 3 as best seen in FIG. 9, and which correspond to signals 24, 44, and 58, respectively of FIG. 1.

Figure 4:
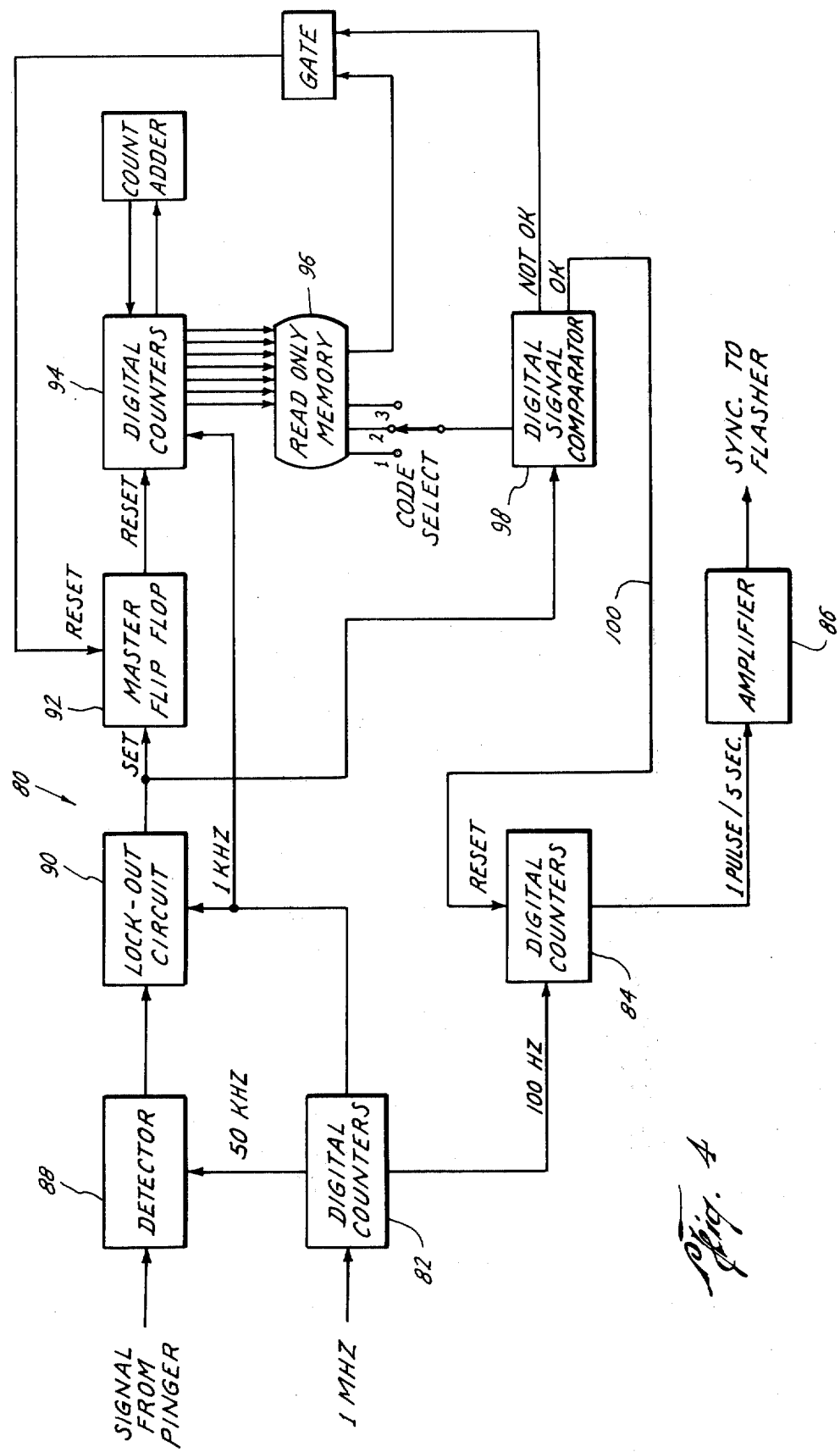
FIG. 4 is an electrical block diagram of the receiver circuit.

Referring now to FIG. 4, the 1 Mhz timing signal received from the common circuit board 60 of FIG. 2 is received by digital counters 82. The counters 82 send a signal to a second set of counters 84, the output of which is connected to an amplifier 86 which actuates and provides the synchronizing signal to a navigational light, for example in FIG. 1 the receiver 30 would actuate the receiver light 26. Therefore, the navigational light connected to the receiver 30 would normally receive an actuating signal from the timing counters 82 and 84 in the absence of a sonic signal from the transmitter circuit of FIG. 3. The receiver circuit 80 also includes a detector 88 which receives the sonic signal from the transmitter 68 of FIG. 3 for the purpose of synchronizing the light 26 of the receiver in FIG. 1 with the light 22 of the transmitter 20 of FIG. 1. However, since there may be environmental noise, such as ships, in the vicinity which might interfere with the sonic signal from the transmitter circuit 68 of FIG. 3, a lockout circuit 90 is provided which will inhibit the control of the receiver circuit 80 in the event that the environmental sonic signal noise exceeds a predetermined level. In the event the lockout circuit 90 does not inhibit normal system operation, the detected signal is sent to a master flip-flop 92 which actuates digital counters 94. The counters 94 actuate a read only memory 96 which provides a code output identical to the transmitter code to which the receiver 80 is to respond. The output from the memory 96 is compared with the detected signal at a digital comparator 98 and in the event that the comparison is properly made, a reset signal is sent through line 100 to reset digital counters 84 which control the actuation of the receiver light 26 thereby insuring that the receiver navigational light is synchronized with the transmitting navigational light.

It is to be noted that the timing signal from the common circuit includes a crystal oscillator 66 and the transmitter circuit 68 of FIG. 3 and the receiver circuit 80 of FIG. 4 includes digital counters for counting down the timing signal to very accurate and stable signals. Therefore, even if the receiver does not successfully decode a sonic signal from the transmitter for an extended period of time, the outputs of the transmitter circuit 68 and the output of the receiver circuit 80 will remain in synchronism for prolonged periods of time.

Figure 5:
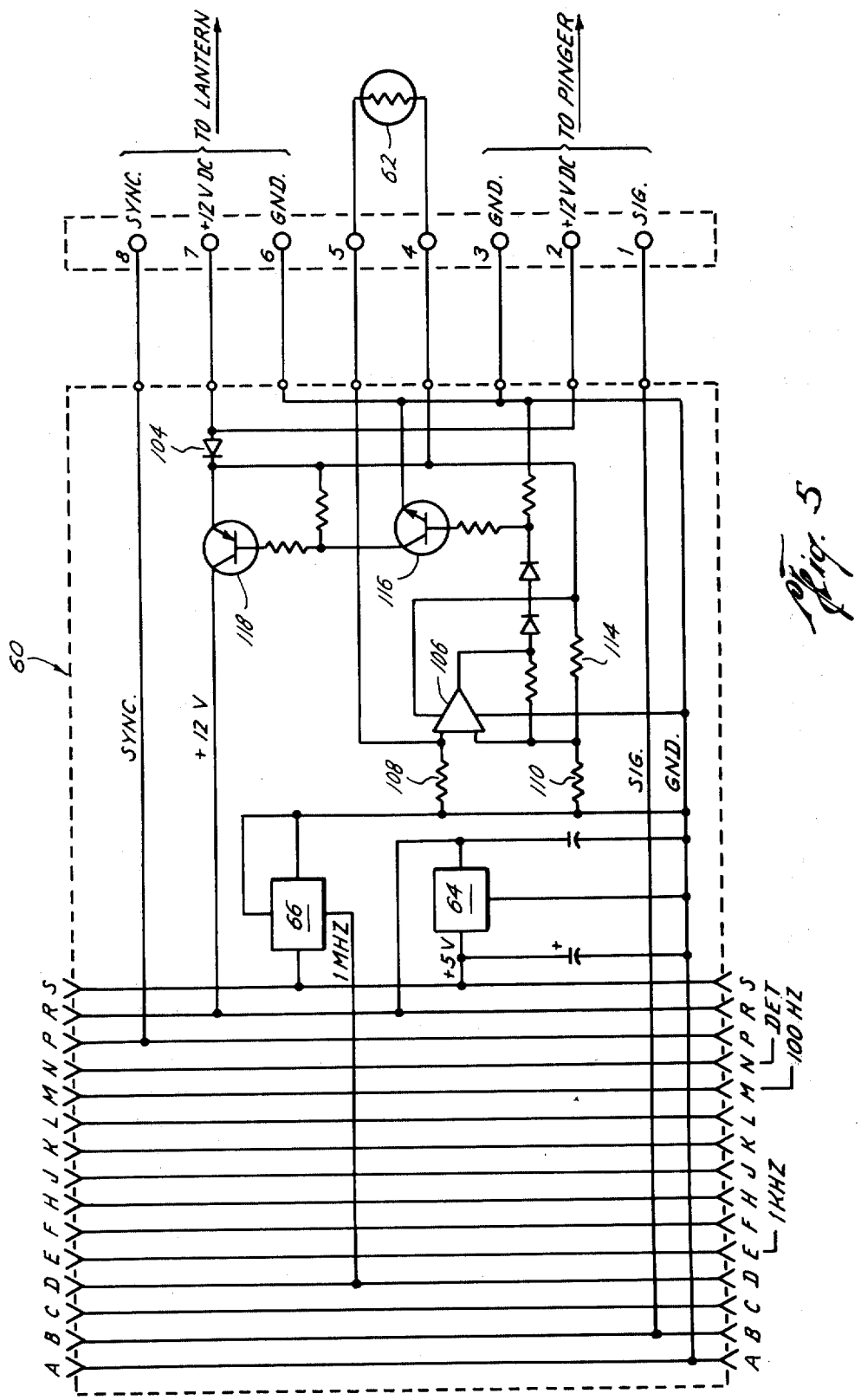
FIG. 5 is an electrical schematic of the common circuit of FIG. 2.

Referring now to FIG. 5, the common circuit of FIG. 2 is shown in greater detail. The photocell sunswitch 62 acts as a switch to disconnect the input voltage from the other circuits during the daytime. Reversed polarity diode 104 protects the general circuit if the input voltage is connected reversed. An operational amplifier 106 is used in this circuit as a voltage comparator. The sunswitch photocell 62 is connected in a voltage divider configuration with resistance 108 and the input voltage. Another voltage divider is formed with resistances 110 and 114. With light falling on the photocell 62, the voltage at the minus terminal of the amplifier 106 is higher than the voltage at the plus terminal. Therefore, the output of the amplifier 106 is low (approximately 1 volt). When the photocell 62 is in darkness, the voltage on the minus terminal of the amplifier 106 is lower than the voltage at the plus terminal of this device and the output of amplifier 106 is high (approximately 11 volts). When the output amplifier 106 is low (daylight) transistor 116 is off and transistor 118 is off. Therefore, no voltage is permitted to reach the other parts of the system. When the output of the amplifier is high (night time) transistor 116 is on and transistor 118 is on supplying voltage to the other circuitry.

The voltage regulator 64 is an integrated circuit device. The unregulated voltage (approximately 12 volts when transistor 118 is on) enters the input of the regulator 64 and the regulated five volts appears at output terminal.

The 1 MHz crystal oscillator 66 accepts the five volts from the regulator 64 and provides a 1 MHz 5 volt squarewave output.

Figure 6:
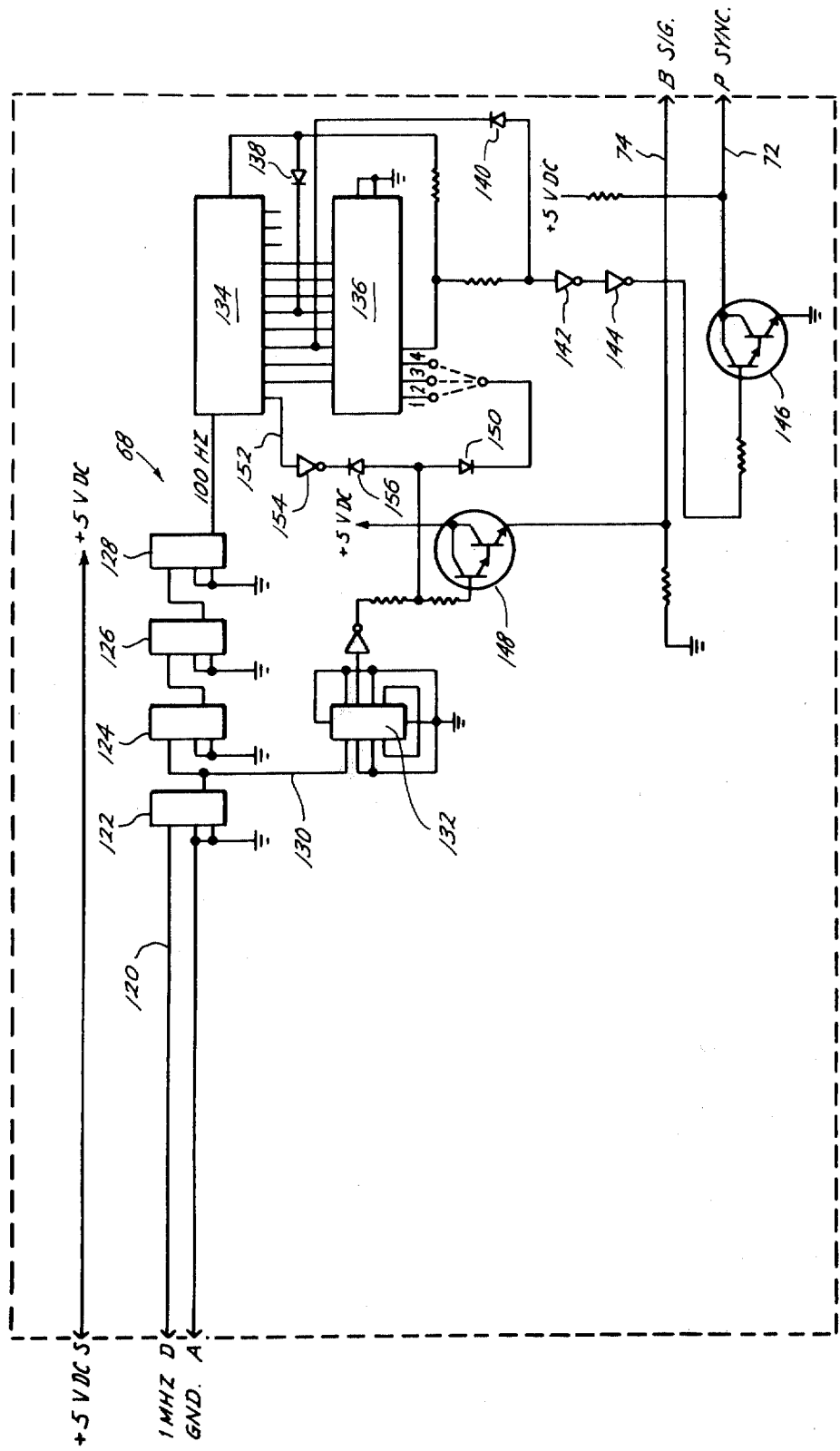
FIG. 6 is an electrical schematic of the transmitter circuit of FIG. 3, FIGS. 7A and 7B together are an electrical schematic of the clock and detector circuit of FIG. 4, FIGS. 8A and 8B together are an electrical schematic of the decoder circuit of FIG. 4.

Referring now to FIG. 6, a more detailed schematic is shown of transmitter circuit 68 as shown in block form in FIG. 3. Circuit 68 receives the 1 MHz signal from the common circuit 60 (FIGS. 2 and 5) on line 120 where it is transmitted to decade (divide by 10) counters 122, 124, 126 and 128 to count down the 1MHz signal to 100 Hz. The 100 KHz signal from the output 130 of counter 122 is transmitted to flip-flop 132 to acquire a 50 KHz signal.

The 100 Hz signal from counter 128 is fed to binary counter 134. The first flip-flop of counter 134 is not used (this flip-flop generates a 50 Hz signal for the remaining flip-flops). The period of 50 Hz is 20 milliseconds. If 250 twenty millisecond intervals are counted, the total interval is 5.000 seconds. Counter 134 does this counting.

The output of the binary counter 134 is used to address the read only memory 136. It is the memory which is programmed according to the code to be transmitted. Outputs 1, 2 and 3 of the memory are three codes illustrated in FIG. 9. Output 4 of the memory 136 is a service line. The service line 4 does two things. It generates the synchronizing signal for the navigational flasher light associated with the transmitter 68 and generates a resetting signal when the counter 134 has reached the count of 250. Diode 138 prevents the synchronizing signal generation from resetting counter 134 and diode 140 prevents the resetting signal from being forwarded as a synchronizing signal.

The synchronizing signal 4 from the memory occurs at count 206 of the binary counter 134. The last signal of each of the codes occurs at count 196. The difference is then 10 counts or 200 milliseconds. Sound travels in water at approximately 5000 ft./sec. So 200 milliseconds corresponds to 1000 feet. The delay between the time the last pulse is transmitted and the time the synchronizing signal is generated corresponds to a transmission time in the water of 200 milliseconds or 1000 feet. Circuitry may be included in the receiver to reduce this delay time to 170 milliseconds or a distance of 850 feet. Therefore, if the transmitter 20 and the receiver 30 (FIG. 1) are placed 850 feet apart with the time delay or 1000 feet apart without the time delay, the lights 22 and 26 will exactly synchronize. At closer distances the receiving light 26 will turn on first, and at farther distances the transmitter light 22 will turn on first.

The synchronizing signal out of the memory 136 is buffered by the two inverters 142 and 144 and finally the transistor pair 146 before being sent on to the light on line 72.

Only one of the code outputs 1, 2 or 3 is used at a time. The following discussion is true for any of the three codes. A code output of the memory is low (0 volts) during a silent period and high (5 volts) during a transmitting period. If the output of the memory is low, the base of transistor 148 is held low through diode 150. If the output of the memory is high, diode 150 is off. Since there are 20 milliseconds per count of the binary counter 134 and it is desired to have a 10 millisecond transmitted burst, the output 152 of the binary counter 134 (a 50 Hz squarewave), an inverter 154 and diode 156 are used to limit the burst length. With this configuration, the output of the inverter 154 is high only for the first 10 milliseconds of the 20 milliseconds that the output of the memory is high. During the second 10 milliseconds, the base of transistor 148 is held low through diode 156 and transmission is inhibited. During the time that both diodes 154 and 156 are off, however, the 50 kHz signal from flip-flop 132 is permitted to the base of transistor 148, amplified, and forwarded to the underwater transducer on output line 74.

Figure 7A:
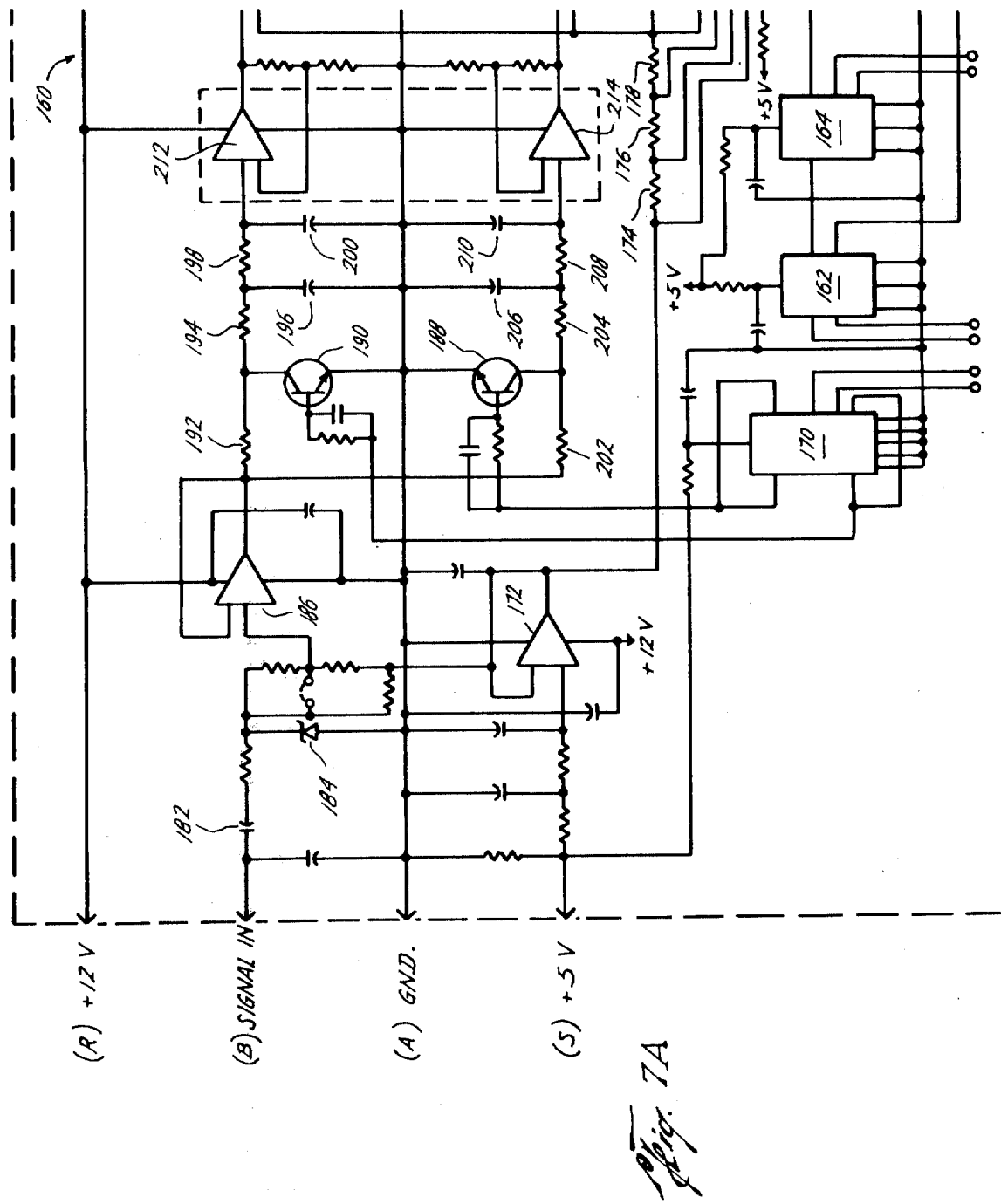
Figure 7B:
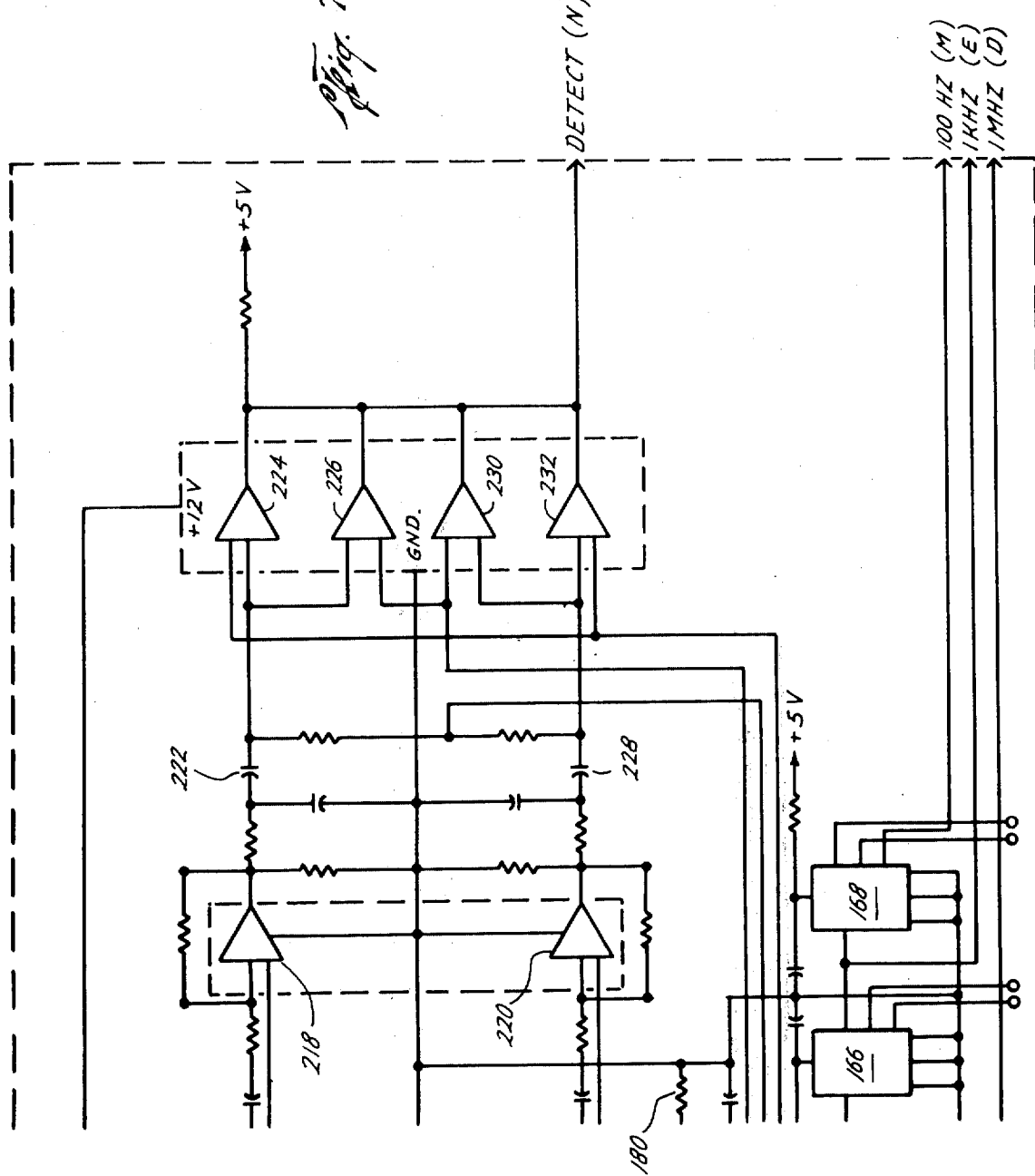

Referring now to FIGS. 7A and 7B, the clock and detector circuits of the receiver 80 of FIG. 4 is best seen. This portion of the receiver circuit has an input plus 12 volts, plus 5 volts, ground, the 1 MHz signal from the crystal oscillator 66 of the common circuit 60, and the sonic signal received by the underwater transducer from the transmitter. The output of the clock and detector circuit, generally indicated by the reference numeral 160, is a 100 Hz signal, a 1 kHz signal and the detected sonic signal.

Four decade counters 162, 164, 166 and 168 are used to count down the 1 MHz signal to 1 kHz and 100 Hz. These two frequencies are used in the decoder circuit. Counts '0' and '5' of counter 162 feed the clock inputs of the two flip-flops 170. Counts '0' and '5' of counter 162 are half of a cycle apart at 100 kHz. This means that the outputs of flip-flops 170 are 50 kHz signals which are one quarter of a cycle (90°) apart.

Voltage follower 172 and its associated components are used to produce a noise free +5 volts. This voltage is divided by the voltage divider consisting of resistances 174, 176, 178 and 180. The voltages produced by this circuit are used as reference voltages in other parts of the circuit.

The input sonic signal from the transmitter is received from the underwater transducer and is coupled through capacitor 182 to diode 184 which acts as a voltage clipping circuit which permits the input signal to go to +9 volts maximum and −0.7 volts minimum. Very large signals are limited to these extremes. The signal then normally feed the voltage follower circuit 186. The voltage follower circuit 186 is simply used as a signal buffer amplifier. This circuit also biases the transducer signal to five volts. The 50 kHz wave form is then varying about plus 5 volts. Transistors 188 and 190 are each fed with a 50 kHz squarewave signal from flip-flop 170. These 50 kHz signals are ninety electrical degrees apart. The period of a 50 kHz signal is 20 microseconds. Each of the transistors 188 and 190 is off for half of this cycle (10 microseconds) and on for the other half of the cycle (10 microseconds). For discussion purposes, the circuit containing transistor 190, resistance 192, resistance 194, capacitance 196, resistance 198 and capacitance 200 will be considered. Elements 194, 196, 198 and 200 form a low pass filter section. Transistor 190 acts as a signal chopper. The 50 kHz signal from follower circuit 186 is chopped at a 50 kHz rate. Thus, exactly one half of a cycle of this incoming signal is permitted to the input of the filter. The phase relationship of the 50 KHz chopping signal and the 50 kHz signal from voltage follower 186 is random. Therefore, in the sampling process, the sample chosen may have an average voltage above, below, or at the 5 volt quiescent voltage from follower 186. If there is no signal out of follower 186 (or if the sample average is 5 volts) then because the chopper 190 operates on a 50% duty factor the voltage averaged by the filter (at the junction of 198 and 200) is 2.5 volts. If the sampling is such that the sample has a net voltage above 5 volts, then the voltage out of the filter will be 2.5 volts plus one half of the net additional voltage. If, on the other hand, the sampling is such that the sample has a net voltage below 5 volts, then the voltage out of the filter will be 2.5 volts minus one half of the net voltage reduction. If the sample of the input signal is centered about the five volt crossing of the signal, the the net change in the voltage sample is zero volts, and the output of the filter will be 2.5 volts plus zero volts or 2.5 volts. So, in this case with a signal present the output of the filter may indicate no change in voltage. It is for this reason that the additional circuit consisting of transistor 188, resistance 202, resistance 204, capacitance 206, resistance 208 and capacitance 210 is included. This circuit also samples the signal from voltage follower 186, but the sample is centered about a point 90 electrical degrees different from the other circuit. This means that in the condition where the circuit containing transistor 190 is sampling about the five volt crossing of the signal from follower 186, the circuit containing transistor 188 is sampling the signal at its maximum deviation from five volts. The output of this filter (junction of 208 and 210) will then be 2.5 volts plus or minus the maximum deviation possible for this input signal. In summary, with no signal present at the input, the output of each of the filters is 2.5 volts. With signal present, the output of each filter may go above 2.5 volts, below 2.5 volts, or may remain at 2.5 volts. However, with signal present, at least one of the filter outputs will not remain at the 2.5 volt quiescent level.

Following each of the filters is a non-inverting amplifier 212 and 214, respectively, with a gain of about 2 each. This amplifier serves three purposes. First, the gain of the circuit amplifies the median 2.5 volt signal from the filter to a median 5 volt signal. Second, the deviation from 2.5 volts (with signal) from the filter is doubled. Third, the signal is buffered from a high impednace filter to a low impedance operational amplifier output.

It is important to remember at this point that the signals received by this circuit occur in 10 millisecond bursts. Also note that the output of amplifiers 212 and 214 are at five volts with no signal and one or both of these outputs will be at some voltage different from five volts with a signal present. A 10 millisecond input signal then typically causes the output of amplifier 212 (for example) to move for 10 milliseconds from its quiescent 5 volt level. This signal is then coupled through capacitance 216 to amplifier 218. The a.c. coupling through 216 is to allow for a d.c. level shift. The other half of the circuit is similar.

The circuitry associated with amplifier 218 will be discussed. The circuitry associated with amplifier 220 is similar. Amplifier 218 is used as a gain of −50 (the minus indicates inversion of the signal) amplifier. Additionally, the output of the amplifier is level shifted so that the output changes about a 3.5 volt level rather than a 5 volt level.

The output of amplifier 218 is coupled to a set of two voltage comparators 224 and 226. The comparison voltages of comparators 224 and 226 are set at 5.0 and 4.7 volts, respectively. So if the voltage on the capacitance 222 changes by more than 0.15 volt from its quiescent 4.85 volt level, the output of one of the comparators will go low. The comparator outputs are wire-ORed together, so it is only necessary for one signal to vary more than 0.15 volt from its no signal level. For reasons stated earlier, the signal on the capacitor 222 may not change during a signal burst, but in this case the signal on capacitor 228 will change during this burst and activate one of its comparators 230 or 232 and produce a detector output.

Figure 8A:
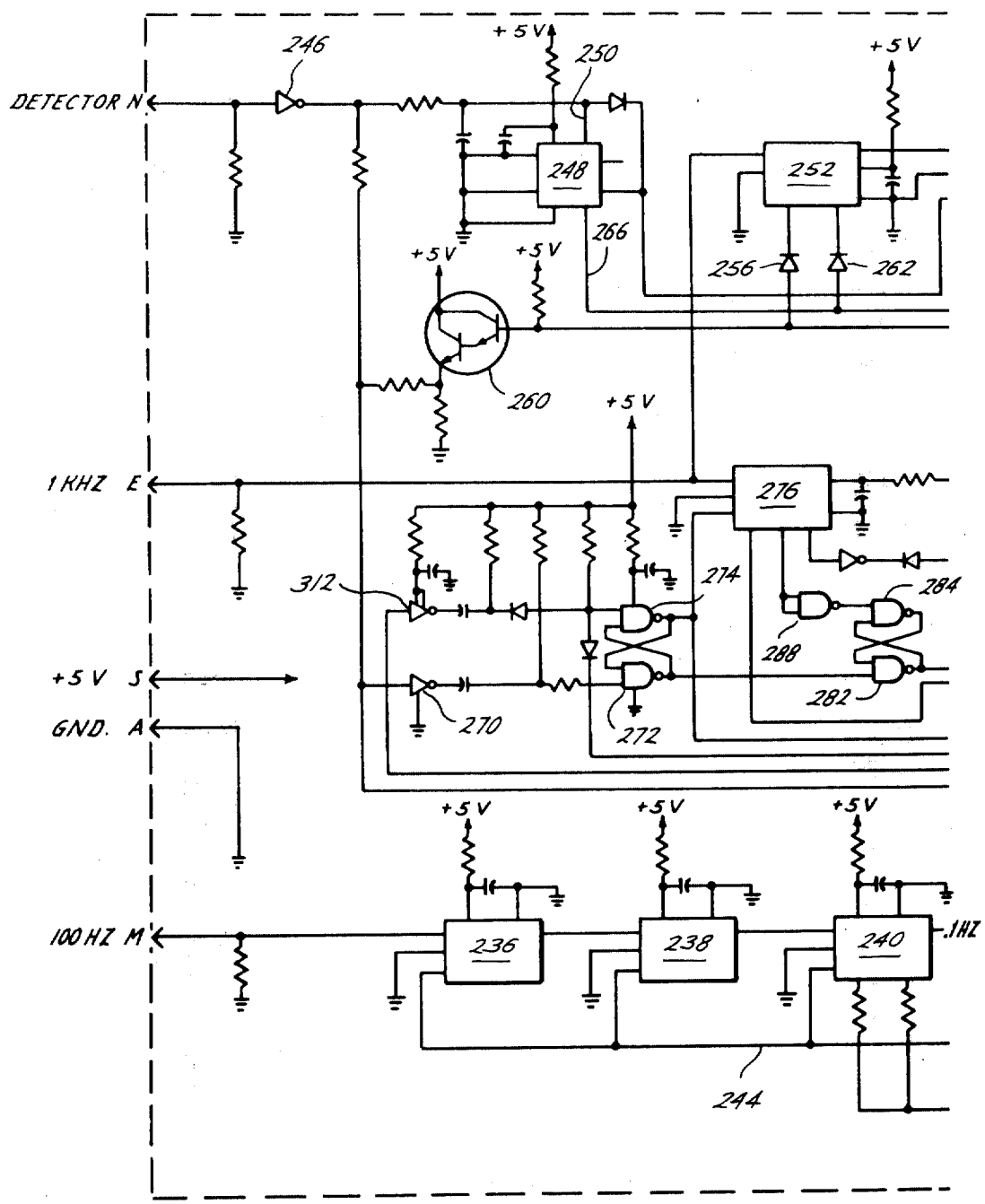
Figure 8B:
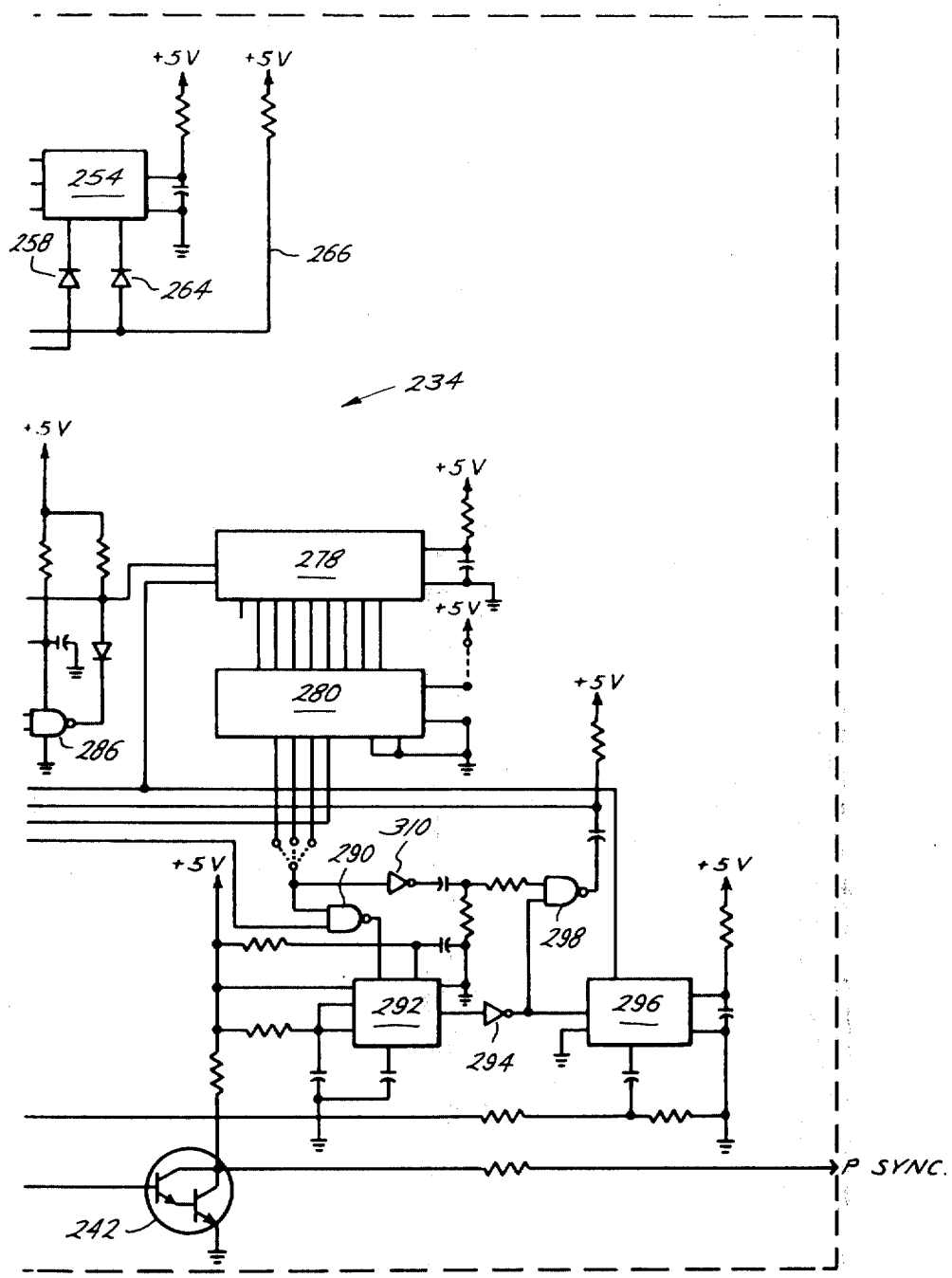

Referring now to FIGS. 8A and 8B, the decoder and sync pulse generator portion of the receiver circuit 80 of FIG. 4 is best seen.

The decoder and sync pulse generator circuit 234 has as inputs plus 5 volts, ground, and from the clock and detector circuit 160 the 100 Hz squarewave, the 1 kHz squarewave, and the detected signal output. The output of this circuit is the synchronizing signal to a light such as the TF-3B flasher/lampcharger.

The sync signal generator portion of this circuit is operating on a continuous basis and is synchronized with the sync signal generator on the transmitter system 68 (FIGS. 3 and 6) when a proper signal code is received.

The synchronizing signal generator consists of decade counters 236, 238 and 240 and transistor 242. With the counters connected in series, a 100 Hz signal into the first counter 236 produces a 0.1 Hz signal at the output of the last counter 240. This corresponds to a period of 10 seconds. Since the light flash period is five seconds in this particular application, counts '0' and '5' are ORed from the last counter to generate a synchronizing signal every 5 seconds. The RESET line 244 of these counters is connected to the decoder circuit so that these counters may be reset when a transmitted series of pulses is successfully decoded.

The remainder of the circuitry is associated with the signal decoding process. Recall that the output of the detector goes low (0 volts) when it detects the presence of a signal. An inverter 246 at the input to this circuit reverses the polarity of this signal. The output of the inverter 246 goes high when a signal is detected and remains low when no signal is detected.

The first portion of this circuit called a noise lockout circuit includes a SET - RESET type flip-flop 248. A detected signal puts a positive voltage on the SET terminal 250. The Q terminal then goes low allowing the decade counters 252 and 254 to begin their counting sequence. The input to the counters is a 1 kHz squarewave. When the counters have counted to the decimal number 01 (after one count) diodes 256 and 258 are reverse biased (off) and a high is transmitted to the base of transistor 260. The signal is then forwarded from the emitter of 260 to the remainder of the circuit for further processing. It is this signal (from the emitter of 260) that is generated each time an incoming signal is detected, which is processed by the following decoding circuitry. When counters 252 and 254 reach the decimal number 99, diodes 262 and 264 are reverse biased and a high is transmitted through line 266 to the RESET input of flip-flop 248. The flip-flop 248 is now reset and available for the next detected signal to set it. This circuit performs two important functions. First, any noise (spurious signals) which occurs after the detected signal sets flip-flop 248, is not transmitted on to the remainder of the decoding circuitry. Second, this circuit makes it necessary that there be a 100 millisecond period of quiet before the transmitted signal is received. If such noise does proceed the proper signal, the pulse transmitted on to the circuit by transistor 260 will arrive at the decoding circuit at the improper time and the decoding circuitry will reset.

The signal from the emitter of transistor 260 is inverted by inverter 270 and then applied to a gate 272. Gates 272 and 274 form a set - reset type flip-flop. In this applicaion, the flip-flop functions to control the operation of the circuitry which follows. If we say that a low input to gate 272 sets the flip-flop (gate 272 output is high; gate 274 output is low) then a low input to gate 274 resets the flip-flop (gate 272 output is low; gate 274 output is high). The reset condition for this flip-flop is the standby condition for the circuit. As soon as the flip-flop is set, a decoding sequence begins. The flip-flop can be reset on one of two conditions. First, it will reset if a decoding sequence has been completed. Second, it will reset if one of the transmitted pulses is missed (or obscured by noise).

The code that is transmitted to the receiving system, one of the codes shown in FIG. 9, consists of nine bursts of a 50 kHz signal. The detected signal consists of nine d.c. pulses. Assuming that the flip-flop formed from the two NAND gates 272 and 274 is reset, the first signal pulse sets the flip-flop. (Subsequent pulses have no effect on the set flip-flop.) When the output of gate 274 goes low, counter 276 can begin counting. Counter 276 divides the 1 KHz input signal to 100 Hz. (Counter 276 is used to permit only a 1 millisecond uncertainty in clocking counter 278.) The 100 Hz from counter 276 feeds binary counter 278 which addresses the memory circuit 280. Between counter 276 and counter 278 is a circuit which performs a special function. This circuit, for reasons to be discussed later, adds a clock pulse to the train of clock pulses transmitted from counter 276. If the flip-flop formed by gates 272 and 274 is reset, the output of gate 272 is low. This low is fed into gate 282 holding the flip-flop formed by 282 and 284 in the reset condition. (Output of gate 282 is high and output of gate 284 is low.) The counts '7' and '8' of counter 276 are each low when the system is reset. If the flip-flop of gates 272 and 274 is set by the first pulse of an incoming code, the output of gate 274 goes low. When count '7' of counter 276 goes high (after 7 milliseconds) it is transmitted through the gate 286, to the clock input of counter 278. When count '8' goes high (1 millisecond later) the output of gate 288 goes low and the flip-flop formed by gates 282 and 284 is set. Thus the gate 286 is disabled and all additional clock pulses for counter 278 must be from the CARRY output of counter 276. The CARRY output of counter 276 is changing state at a 100 Hz rate. The first flip-flop of binary counter 278 is not used (this flip-flop generates a 50 Hz signal for the remaining flip-flops). The period of 50 Hz is 20 milliseconds. The remaining flip-flops thus receive a clock pulse every 20 milliseconds.

The flip-flops from 'Q$_2$' of counter 278 on are used to address the read only memory 280. The memory is programmed with the same codes as the memory in the transmitting unit. Outputs 1, 2, and 3 of the memory are the three programmed codes shown in FIG. 9, and output 4 is a service line. The service line resets the decoding system when the entire code has been read from the memory.

The following circuitry compares the incoming code to the code stored in the receiver memory. (The same code must be selected for both the transmitter and the receiver for a proper decoding sequence to occur.) The first pulse into the flip-flop formed by gate 272 and 274 begins the decoding sequence. This pulse (and subsequent pulses) also appear at one input of gate 290. Since the output of the memory is high (as programmed) gate 290 is enabled, and the input pulse is permitted to go on to the TRIGGER input of 292. The counting sequence is now begun. The output of the memory remains low until the next position at which a signal pulse should occur. At this point, the output of the memory goes high again. This high on gate 290 enables the gate 290. The next input pulse (assuming it occurs) is permitted to the TRIGGER input of 292. This sequence continues through all nine pulses of the code. The gate 290 functions as an acceptance window for signal input pulses. Detected pulses which occur outside this window interval are not transmitted to 292.

Figure 10:
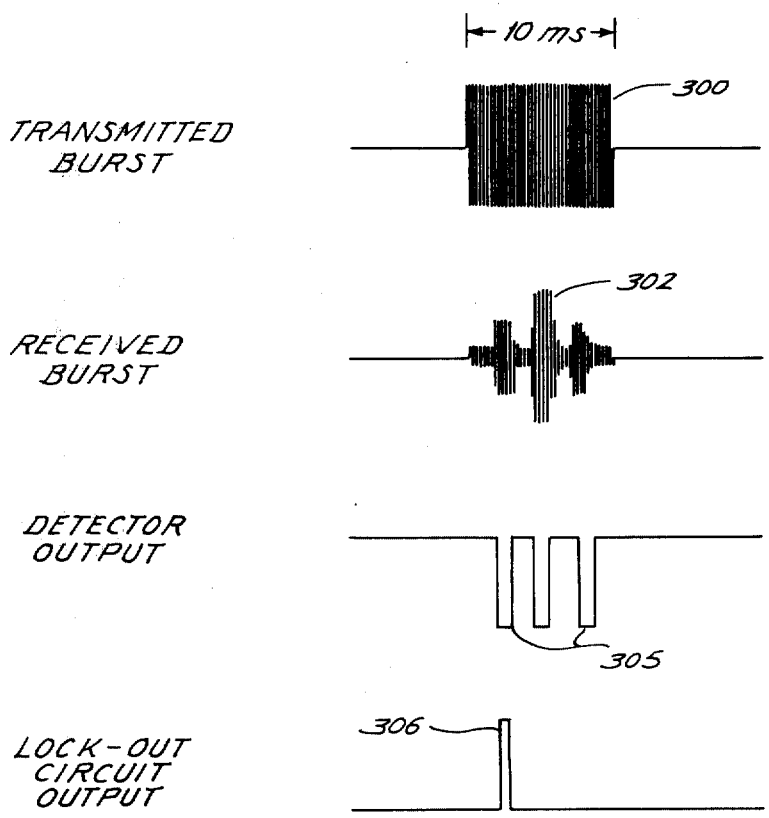
FIG. 10 is a signal diagram for use in the explanation of the lockout circuit.

It is now important to understand an important feature of the lockout circuit and the reason for the circuit described above which adds a clock pulse (one count) to counter 278. Refer to FIG. 10.

The transmitted burst from the transmitter will be as indicated at 300. However, due to diffraction, and reflections the signal 302 arriving at the receiver may have large irregularities. The detector only responds to signals above a set amplitude. Therefore the output of the detector may consist of several signal pulses 305. The lockout circuit responds to the first pulse 306, but "locks out" pulses which follow. The resultant signal from the lockout circuit is one well formed pulse 306.

Note that due to this received signal the detector does not respond at the beginning of the received signal. In fact, the detector may only respond for a very short portion of the received burst. If the detector output is the only known feature then there is some uncertainty about when the signal burst begins and ends. (The detector may only respond at the beginning of the burst, or only at the end of the burst, or only somewhere in the middle of the burst.) So, if the detector responds to the burst with one very short output pulse, it may be that the burst began 10 milliseconds before the response or that the burst ends 10 milliseconds after the response. To allow for the uncertainty associated with the first received burst, the circuit must look for subsequent bursts over a 20 millisecond period. For example, burst two may be detected at exactly the programmed time from burst one, or it may be detected 10 milliseconds before the programmed time for it, or it may be detected 10 milliseconds after the time programmed for it. The added clock pulse to counter 278 is to allow the acceptance window to open 10 milliseconds early. (One count at a rate of 100 counts/second is 10 milliseconds.)

When gate 290 is enabled and a signal from the detector is transmitted to gate 290 (the pulse window is open and a pulse is received), a trigger signal is given to 292 which is used as a monostable multivibrator. The period of the monostable is approximately 30 milliseconds. The output of the monostable is high when triggered. This output is inverted by inverter 294 and is connected to the clock input of counter 296. At the end of the triggered period of the monostable 292, the output of the inverter 294, will go high. This transition will clock counter 296 (one count). There are nine pulses per code and if each of the nine pulses triggers the monostable, then counter 296 will have received nine clock pulses at the end of the code. When the ninth clock pulse is received, count nine of counter 296 goes high. This high is transmitted to the reset terminals of counters 236, 238 and 240, which are counters for the synchronizing signal generator. The high applied to the reset terminal of these components resets them and synchronizes the receiver sync pulse generator with the transmitter sync pulse generator.

There is one additional circuit which determines if the pulse window has opened and no pulse has been received (if an expected pulse was not received). If monstable 292 was triggered by a signal from gate 290 (if a pulse was admitted to the trigger input of monstable 292 when gate 290 was enabled by the memory), then the output of inverter 294 will be low for 30 milliseconds. A low to the input of gate 298 disables the gate. However, if the monstable 292 was not triggered by a pulse from gate 290, then the output of inverter 294 will remain high. Gate 298 is enabled. Inverter 310 inverts the output of the memory. After the 20 millisecond window interval, the output of inverter 310 goes high. This high is differentiated to a short pulse and transmitted to gate 298. If the gate 298 is enabled (the monstable was not triggered), the pulse (now inverted) is transmitted to the master control flip-flop formed from gates 272 and 274. This pulse resets the flip-flop. So, the system works such that if a detector pulse is expected and none arrives the system resets.

The system may reset also by completing the decoding process. At count 206, the memory 280 is programmed at output four to give an output (positive pulse). This pulse is inverted by inverter 312. It now becomes a negative going pulse suitable for resetting the flip-flop formed from gates 272 and 274.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts will readily suggest themselves to those skilled in the art and which are encompassed within the spirit of the invention and the scope of the appended claims.

What is claimed is:

1. An acoustical navigational light system having a transmitter and at least one receiver for controlling the actuatiion of a marine navigational aid connected to each of the transmitter and the receiver comprising, said transmitter including,
   a crystal oscillator timing clock,
   digital counter means connected to the clock output,
   a programmed digital read only memory connected to the counter output and providing a coded signal output of short and time related pulses of less than one second duration for transmission through the water to the receiver,
   a navigational light aid connected to and receiving an actuating signal from the counter means, said receiving including,
   a crystal oscillator timing clock,
   digital counter means connected to the clock output for providing timing signals,
   a navigational light air connected to and receiving an actuating signal from the counter means,
   a detector for detecting the coded acoustical signal from the transmitter,
   second digital counter means receiving said coded acoustical signal,
   a programmed digital read only memory connected to the second counter means and having a coded memory providing an output identical to the coded signal output of the transmitter memory,
   a digital comparator connected to the dectector and to the receiver memory for determining if the proper actuating code is received by the receiver, said comparator connected to and resetting the first counter means when the receiver receives a correct signal from the transmitter.

2. The apparatus of claim 1 wherein the code provided by the memory of the transmitter and the receiver includes a plurality of spaced signal pulses separated by non-pulses.

3. The apparatus of claim 1 wherein the receiver includes,
   a lockout circuit which inhibits the control of the receiver by the transmitter when environmental acoustical signals exceed a predetermined level.

4. The apparatus of claim 2 including,
   a lockout circuit which includes means for resetting the receiver unless a relatively noise free period proceeds each spaced signal pulse.

* * * * *